US008041729B2

(12) United States Patent
Vandelle et al.

(10) Patent No.: US 8,041,729 B2
(45) Date of Patent: Oct. 18, 2011

(54) CATEGORIZING QUERIES AND EXPANDING KEYWORDS WITH A COREFERENCE GRAPH

(75) Inventors: Gilles Vandelle, Grenoble (FR); Eustache Diemert, Grenoble (FR)

(73) Assignee: Yahoo! Inc., Sunnyvale, CA (US)

( * ) Notice: Subject to any disclaimer, the term of this patent is extended or adjusted under 35 U.S.C. 154(b) by 266 days.

(21) Appl. No.: 12/390,066

(22) Filed: Feb. 20, 2009

(65) Prior Publication Data

US 2010/0228742 A1    Sep. 9, 2010

(51) Int. Cl.
*G06F 17/30* (2006.01)
(52) U.S. Cl. ........ 707/767; 707/706; 707/713; 707/736; 707/758
(58) Field of Classification Search ............ 707/706, 707/713, 736, 758
See application file for complete search history.

(56) References Cited

U.S. PATENT DOCUMENTS

| | | | |
|---|---|---|---|
| 5,721,902 A | 2/1998 | Schultz | |
| 6,169,986 B1 | 1/2001 | Bowman et al. | |
| 6,442,545 B1 * | 8/2002 | Feldman et al. | 1/1 |
| 6,876,997 B1 * | 4/2005 | Rorex et al. | 1/1 |
| 6,947,930 B2 | 9/2005 | Anick et al. | |
| 7,047,236 B2 * | 5/2006 | Conroy et al. | 1/1 |
| 2002/0059161 A1 | 5/2002 | Li | |
| 2006/0106767 A1 | 5/2006 | Adcock et al. | |
| 2007/0016545 A1 * | 1/2007 | Broder et al. | 707/1 |
| 2007/0038622 A1 | 2/2007 | Meyerzon et al. | |
| 2008/0243811 A1 * | 10/2008 | He et al. | 707/5 |
| 2009/0006354 A1 * | 1/2009 | Brisbart et al. | 707/5 |
| 2010/0094835 A1 | 4/2010 | Lu et al. | |

OTHER PUBLICATIONS

Peter Anick, et al., "Similar Term Discovery Using Web Search," in European, editor, *Proceedings of the Sixth International Language Resources and Evaluation (LREC'08)*, Marrakech, Morocco, 2008, pp. 1209-1213.
Steven M. Beitzel, et al., "Automatic Web Query Classification Using Labeled and Unlabeled Training Data," in *SIGIR '05: Proceedings of the $28_{th}$ Annual International ACM SIGIR Conference on Research and Development in Information Retrieval*, New York, NY, USA, 2005, ACM, 2 pages.
Andrei Broder, "A Taxonomy of Web Search," SIGIR Forum, 36(2):3-10, 8 pages.

(Continued)

*Primary Examiner* — Apu Mofiz
*Assistant Examiner* — Hung D Le
(74) *Attorney, Agent, or Firm* — Hickman Palermo Truong & Becker LLP; Christian Nicholes; Eric L. Sutton

(57) ABSTRACT

A method and apparatus is provided for determining related keywords to narrow a query, and/or for categorizing a query. A keyword graph connects keyword nodes to each other based on degrees of cross-reference indicating how frequently keywords associated with the nodes appear in searches. A domain node representing a category hooks to a category-matching node in the keyword graph. Based at least in part on a degree of cross-reference between another node and the category-matching node, the domain node hooks to the other node. Alternately, the domain node hooks to nodes that match user-identified keywords. At query time, the query is categorized by the domain node closest to a node matching the query. Keywords related to the category may be determined from the nodes that are hooked to the domain node. The related keywords can be used to narrow a search or expand the metadata of a document.

34 Claims, 16 Drawing Sheets

OTHER PUBLICATIONS

Andrei Broder et al., Robust Classification of Rare Queries Using Web Knowledge, in *SIGIR '07: Proceedings of the 30th Annual International ACM SIGIR Conference on Research and Development in Information Retrieval*, New York, NY, USA 2007, ACM, 8 pages.

Soumen Chakrabarti, "*Mining the Web: Discovering Knowledge From Hypertext Data*," Morgan Kaufmann, 2003, pp. 164-169.

Abdur Chowdhury et al., "Operational Requirements for Scalable Search Systems," in *CIKM '03: Proceedings of the Twelfth International Conference on Information and Knowledge Management*, pp. 435-442, New York, NY, USA, 2003, ACM Press.

Susan Dumais et al., "Hierarchical Classification of Web Content," in *SIGIR '00: Proceedings of the 23rd Annual International ACM SIGIR Conference on Research and Development in Information Retrieval*, 9 pages, New York, NY, USA, 2000, ACM Press.

Mathias Géry et al., "Web as Huge Information Source for Noun Phrases Integration in the Information Retrieval Process," in *IKE '02: International Conference on Information and Knowledge Engineering*, 6 pages, CSREA Press, 2002.

Luis Gravano et al., "Categorizing Web Queries According to Geographical Locality," in *CIKM '03: Proceedings of the Twelfth International Conference on Information and Knowledge Management*, 9 pages, New York, NY, USA, 2003, ACM.

Thorsten Joachims, "Text Categorization with Support Vector Machines: Learning with Many Relevant Features," in C. Nédellec and C. Rouveirol, editors, *Proceedings of ECML-98, 10th European Conference on Machine Learning*, No. 1398, 18 pages, Chemnitz, DE, 1998, Springer Verlag, Heidelberg, DE.

In-Ho Kang, et al., "Query Type Classification for Web Document Retrieval," in *SIGIR '03: Proceedings of the 26th Annual International ACM SIGIR Conference on Research and Development in Information Retrieval*, pp. 64-71, New York, NY, USA, ACM Press.

Zsolt T. Kardkovács et al., "The Ferrety Algorithm for the KDD Cup 2005 Problem," *SIGKDD Explorations, Newsl.*, 7(2):111-116, 2005, 6 pages.

Ying Li et al., "KDD Cup-2005 Report: Facing a Great Challenge," *SIGKDD Explorations, Newsl.*, 7(2):91-99, Dec. 2005.

Shuang Liu et al., "An Effective Approach to Document Retrieval Via Utilizing WordNet and Recognizing Phrases, in *SIGIR '04: Proceedings of the 27th Annual International ACM SIGIR Conference on Research and Development in Information Retrieval*," pp. 266-272, New York, NY, USA, 2004, ACM Press.

Christopher D. Manning et al., "*Introduction to Information Retrieval*," Cambridge University Press, Online Edition, Jul. 2008, 581 pages.

George A. Miller et al., "Introduction to WordNet: An On-line Lexical Database," *International Journal of Lexicography*, 86 pages, revised Aug. 2003.

Arzucan Özgür et al., "Co-Occurrence Network of Reuters News," *International Journal of Modern Physics C*, 19(5):689-702, Dec. 2008.

Dou Shen et al., $Q^2C@UST$: Our Winning Solution to Query Classification in KDDCup 2005, *SIGKDD Explorations, Newsl.*, 7(2):100-110, 2005.

Dou Shen et al., "Query Enrichment for Web-Query Classification," *ACM Transactions on Information Systems*, 24(3):320-352, 2006.

Dou Shen et al., "Building Bridges for Web Query Classification," in *SIGIR '06: Proceedings of the 29th Annual International ACM SIGIR Conference on Research and Development in Information Retrieval*, pp. 131-138, New York, NY, USA, 2006, ACM.

Olga Vechtomova, "Noun Phrases in Interactive Query Expansion and Document Ranking," *Information Retrieval*, 9(4):399-420, 19 pages, Sep. 2006.

Carl Vogel et al., "Genericity is Conceptual, Not Semantic," Technical Report, University of Dublin, Trinity College, Jul. 2002, 10 pages.

David Vogel et al., "Classifying Search Engine Queries Using the Web as Background Knowledge," *SIGKDD Explorations, Newsl.*, 7(2)117-122, 2005.

Hugo Zaragoza et al., "Ranking Very Many Typed Entities on Wikipedia," in *CIKM '07: Proceedings of the Sixteenth ACM Conference on Conference on Information and Knowledge Management*, pp. 1015-1018, New York, NY, USA, 2007, ACM.

Qui, Yonggang et al., "Concept Based Query Expansion", 1993, ACM, 11 pages.

\* cited by examiner

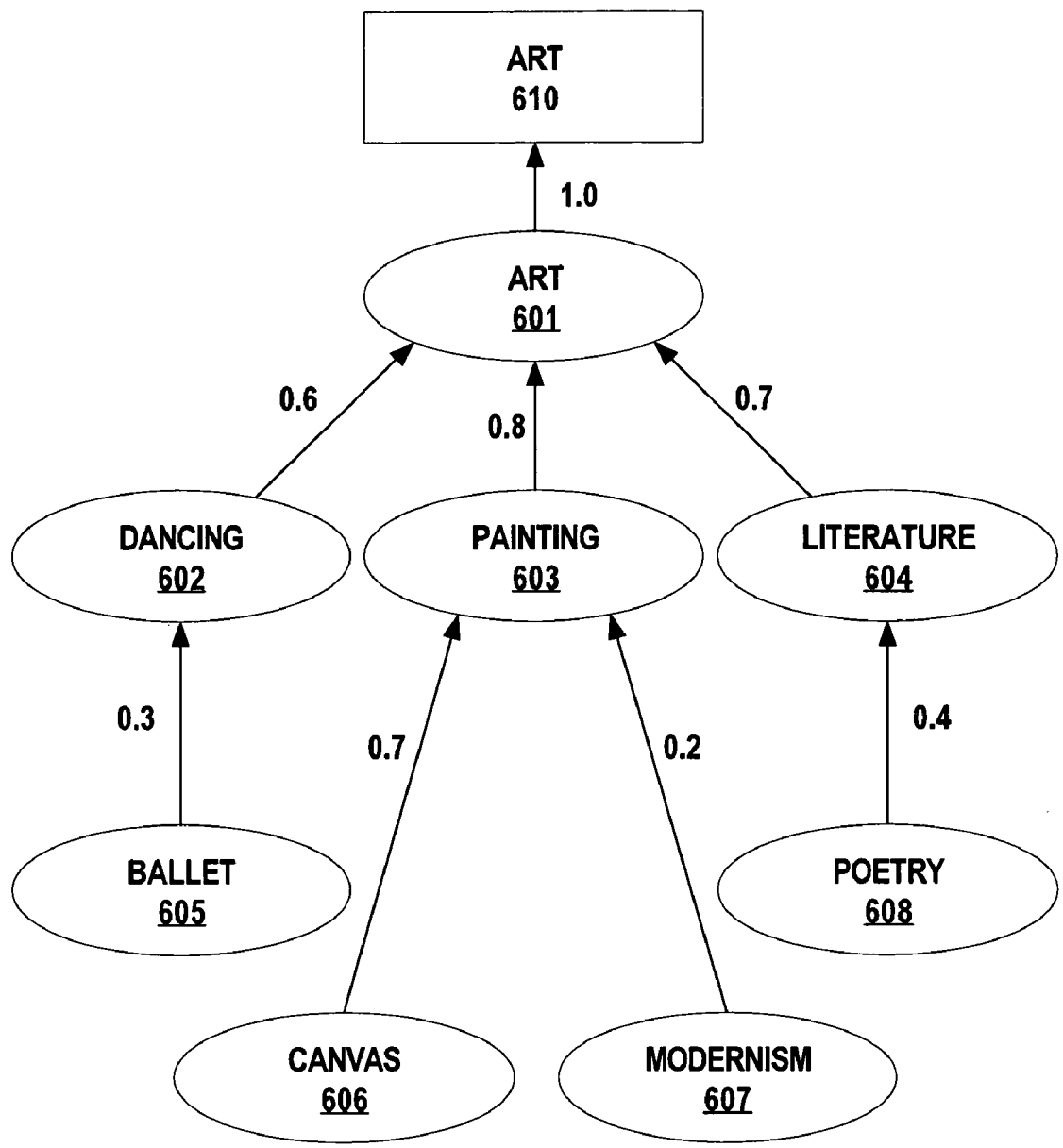

CATEGORIZING QUERIES AND EXPANDING KEYWORDS WITH A COREFERENCE GRAPH

CROSS-REFERENCE TO RELATED APPLICATIONS

Prisma terms, which are discussed in this application, are derived through the use of systems and methods described more fully in U.S. Pat. No. 6,947,930, entitled "SYSTEM AND METHOD FOR INTERACTIVE SEARCH QUERY REFINEMENT," which was filed on Apr. 25, 2003, the disclosure of which is hereby incorporated by reference in its entirety.

Keyword graphs, which are discussed in this application, are described in patent application Ser. No. 11/768,273, assigned to Yahoo! Inc., filed on Jun. 26, 2007, and since published on Jan. 1, 2009, as Patent Application Publication No. 2009/0006354, entitled "SYSTEM AND METHOD FOR KNOWLEDGE BASED SEARCH SYSTEM," the entire contents of which is hereby incorporated by reference as if fully set forth herein.

The applicants hereby rescind any disclaimers of scope and any express limitations in the patent involving prisma terms, the patent application involving keyword graphs, and the prosecution history of these documents.

FIELD OF THE INVENTION

The present invention relates to query categorization and keyword expansion using keyword graphs.

BACKGROUND

The goal of search is to find the most relevant information. Popular search engines such as Yahoo!, Google, and MSN, have relied on traditional horizontal approach to searching. Horizontal search engines are usually characterized by a lack of a hierarchal structure. Horizontal search engines rely on search crawlers that typically index almost everything over the Internet or a network. The results they produce span a very broad range of categories. However, users frequently desire search results from a narrower range of categories.

Since search queries tend to be short, one technique requires the search query to be more complex. Some search systems allow users to input complex logic queries in order to get better results. This approach is undesirable because the required search format in such systems is no longer intuitive. Some users would therefore not take the time to learn to use a system and avoid it altogether. Once a user is familiar with the particular search format, even more time and effort is required to craft a proper search statement.

In order to narrow searches while still allowing initial search queries to remain simple, a knowledge-based search engine suggests additional search terms to add to the initial search query. The knowledge-based search engine asks the user for keywords related to the initial query, and the user is required to submit the additional keywords at query time. The process of determining related keywords is difficult and time-consuming for the user. Thus, there is a need for an approach that is more efficient for the user performing a knowledge based search.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A-6D are diagrams that each illustrate a domain node hooked to a keyword graph.

DETAILED DESCRIPTION

Figure 1:
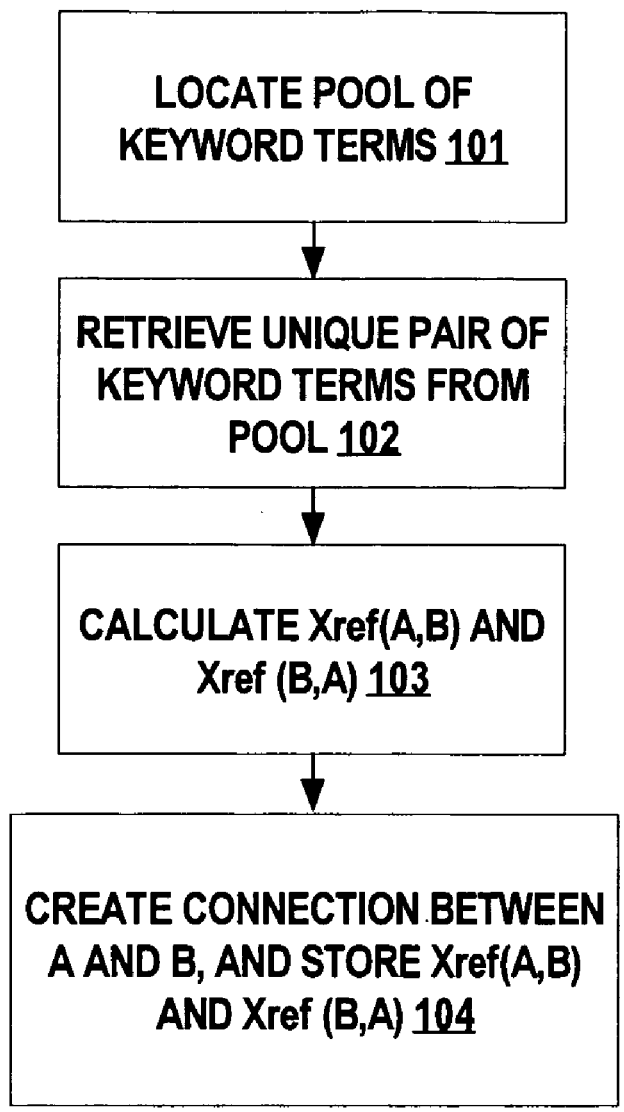
FIG. 1 is a diagram illustrating one method for connecting nodes in a keyword graph.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for determining related keywords to narrow a query, and/or for categorizing the query. A keyword graph connects keyword nodes to each other with degrees of cross-reference that are based at least in part on how frequently keywords associated with the nodes appear in searches. The degrees of cross-reference are calculated based at least in part on the frequency by which a keyword for one node appears in the search results of a keyword for another node. Adding a special type of node called a domain node to the keyword graph allows a keyword to be categorized based at least in part on the domain node to which that keyword is connected. Each domain node represents a category, and the user can determine the connectivity of the domain node when the domain node is hooked into the keyword graph. The user can modify the connectivity of the domain node in the keyword graph if the search results are sub-optimal. Adding domain nodes to the keyword graph provides the user with a powerful tool for query categorization and keyword expansion.

Overview of Hooking in Domain Node

A category may be hooked into a keyword graph so that the query may be narrowed or categorized based at least in part on how the category is connected in the keyword graph. To hook a category into the graph, the category is matched to a matching node or nodes in the keyword graph. A domain node is created and hooked to the matching node. Alternately, the matching node is stored as the domain node. In one embodiment, the domain node is hooked to other nodes automatically. A graph node is associated with the matching node based at least in part on a degree of cross-reference between the graph node and the matching node. If the degree of cross-reference satisfies a threshold, the graph node is hooked to the domain node.

In one embodiment, a distant node is associated with the domain node based at least in part on a degree of cross-reference between the distant node and the graph node, and optionally the degree of cross-reference between the graph node and a hooked node such as the matching node or nodes. If a combination of the degrees of cross-reference satisfies a threshold, the distant node is hooked to the domain node, or included in the domain node definition.

In another embodiment, the domain node is hooked to other nodes based on a keyword and a category provided by the user. The keyword from the user is matched to a keyword node or nodes, and the category is matched to a domain node or nodes. The keyword node is hooked to the domain node. Optionally, a distant node is hooked to the domain node where the distant node is associated with the keyword node based on a degree of cross-reference that satisfies a threshold.

Overview of Using Domain Node to Categorize Query

At query time, the domain nodes of the keyword graph can be used to categorize the query. Once the query is received, a determination is made as to the domain node or nodes that are closest to one or more query nodes matching the query. In one embodiment, the query matches one or more query nodes that are hooked to a domain node. In another embodiment, the query matches one or more distant nodes that are within a certain number of node connections from the domain node.

In yet another embodiment, a list of terms with associated weights, or a prisma vector, is determined from search results for the query. The terms and weights of the prisma vector are then mapped into the graph. The closest matching domain node or nodes are determined from the terms and weights in the keyword graph. By using the list of terms and weights from search results for the query, this method provides better coverage of the query term but is more expensive to calculate.

Overview of Using the Categorized Query

Once the query is categorized by a domain node, keywords related to the category may be determined based at least in part on related nodes that are hooked to the domain node. In one embodiment, the related keywords can be used to narrow search results for the query. Optionally, the user may be provided with related keywords from the related nodes. In one embodiment, the user selects keywords from the related keywords in order to narrow search results for the query. The related keywords can also be used to expand the metadata of a document by using a word from the document as the query. The set of related keywords is added to the metadata of the document. Optionally, the category can be used to direct the query to a category-specific module.

Determining Degrees of Cross-Reference

In one embodiment, prisma terms are used to determine the degree of cross-reference between nodes. Prisma terms are the most relevant terms of a document, such as one of the documents appearing in search results. A prisma term may be one or multiple words and also include corresponding attributes. For instance, a person's name may be prisma term, and it may be accompanied with a symbol such as 'p' that indicates "person" is a corresponding attribute. The degree of cross-reference between A and B is determined by computing the frequency by which A appears the prisma terms of search results for B, and the frequency by which B appears in the prisma terms of search results for A. The prisma terms and search results can be determined by some computer device and kept on some storage device for further use. A more detailed description of prisma terms can be found in U.S. Pat. No. 6,947,930, entitled "SYSTEM AND METHOD FOR INTERACTIVE SEARCH QUERY REFINEMENT," which has been incorporated by reference in its entirety.

In another embodiment, the degree of cross-reference between a first term and a second term is based at least in part on a rank of a document containing the second term in search results for the first term. In another embodiment, the degree of cross-reference between a first term and a second term is based at least in part on a total frequency by which the first term, the second term, or both terms appear in search results for queries. A relative frequency may be calculated and used for the degree of cross-reference based at least in part on the total frequency and the frequency by which a second term appears in search results for a first term.

In another embodiment, concepts are extracted from documents using other known techniques. For example, words in documents may be detected by using a word list such as a dictionary. Each word in the word list is either found or not found in the document. If a first word is found in a high percentage of documents associated with a second word, then the first word can be given a high degree of cross-reference with the second word. Similarly, if the second word is found in a high percentage of documents associated with the first word, then the second word can be given a high degree of cross-reference with the first word. In another example, words from a pre-existing keyword graph are detected in documents. The collection of words in the keyword graph can be used as a word list in the manner described above. Other examples might impose limitations on the absolute or relative frequency by which a word appears in a document, or the proximity between words in a document. There are numerous possible techniques for calculating a value for the strength by which terms reference each other, or a degree of cross-reference between the terms. The methods described herein are not limited to any particular technique now known or later conceived.

The Keyword Graph

FIG. 1 shows an embodiment of the present invention illustrating a method used in generating a keyword graph. The first step requires a large pool of terms to be located, 101. For example, the terms may be stored in a database from sources such as a dictionary, Wikipedia®, or user search query logs. After a suitable source has been located, a unique pair of terms, designated A and B, are retrieved from the keyword pool, 102. If and when this step is repeated, A or B may be retrieved again in another pair of terms. For instance, A may be retrieved again with some other term, X.

After retrieving a unique A and B, the degrees of cross-reference, designated Xref(A, B) and Xref(B, A), are calculated, 103. Xref(A, B) first finds the result set of N lists of prisma terms from the first N first documents of a Web search of A. The list of documents is generated from search results for query A. The number of documents for A that have B as a prisma term is denoted as Xref(A, B). Xref(A,B) indicates how frequently B is referenced by a search of A. Similarly, Xref(B,A) is calculated, which indicates how frequently A is referenced by a search of B. Xref(B,A) and Xref(A,B) are also called degrees of cross-reference. In step 104, the degrees of cross-reference, Xref(A,B) and Xref(B,A), are stored in a connection created between nodes A and B. If the degrees of cross-reference between two nodes are equal or approximately equal, a single node may be created that represents both A and B. Degrees of cross-reference between nodes are calculated until a sufficient keyword graph is formed.

Figure 2:
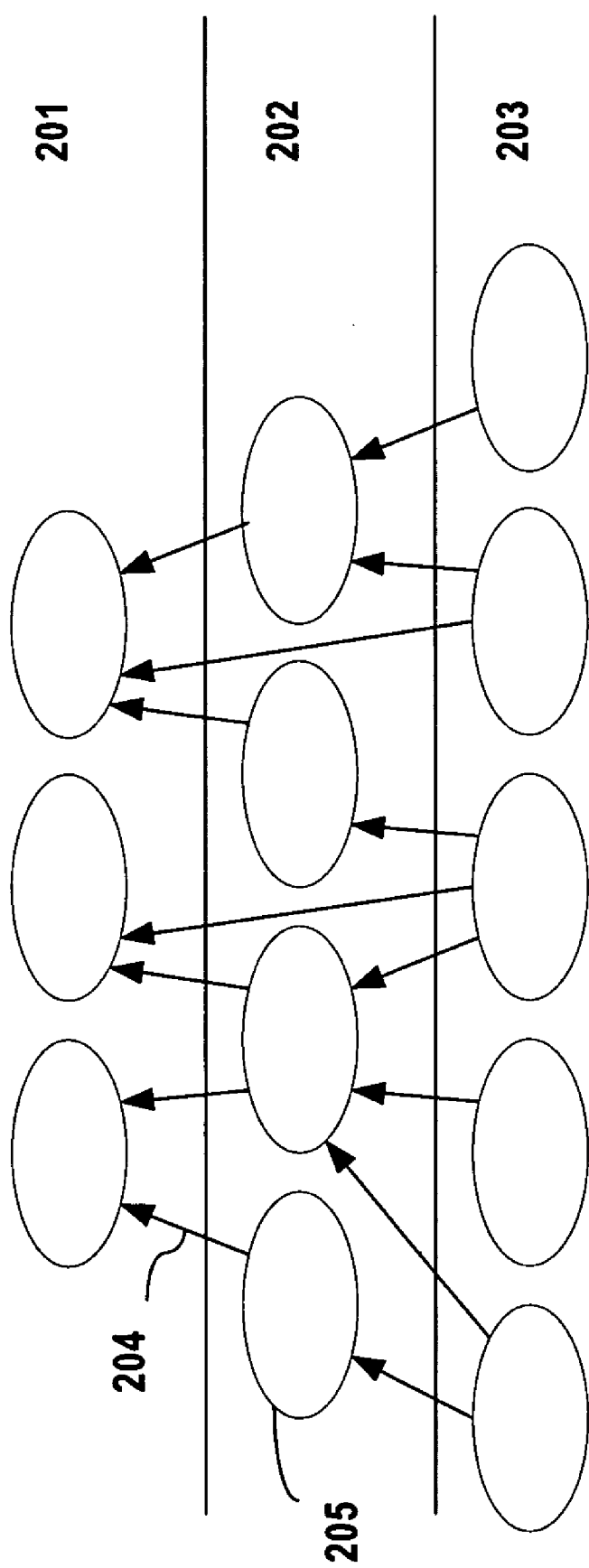
FIG. 2 is a diagram illustrating the nodes and energy levels of a basic keyword graph.

In one embodiment, a directed acyclic graph, or a graph with no cycles may be used. FIG. 2 shows an example of a directed acyclic graph, with nodes 205, and connections 204. The nodes of the graph are in separate energy levels and energy "flows" in one direction and never lead back to themselves. The nodes at the top energy level, 201, are where all the energy flows to and hence represent the most common and generic topics. The nodes at lowest energy level, 203, represent the most topic specific terms. For example, if nodes A and B are stored in the graph, then a connection is made from A to B if Xref(A,B)>Xref(B,A), making B the more generic term. On the other hand, a connection is made from B to A if Xref(B,A)>Xref(A,B), making A the more generic term.

Using the Keyword Graph

Figure 4:
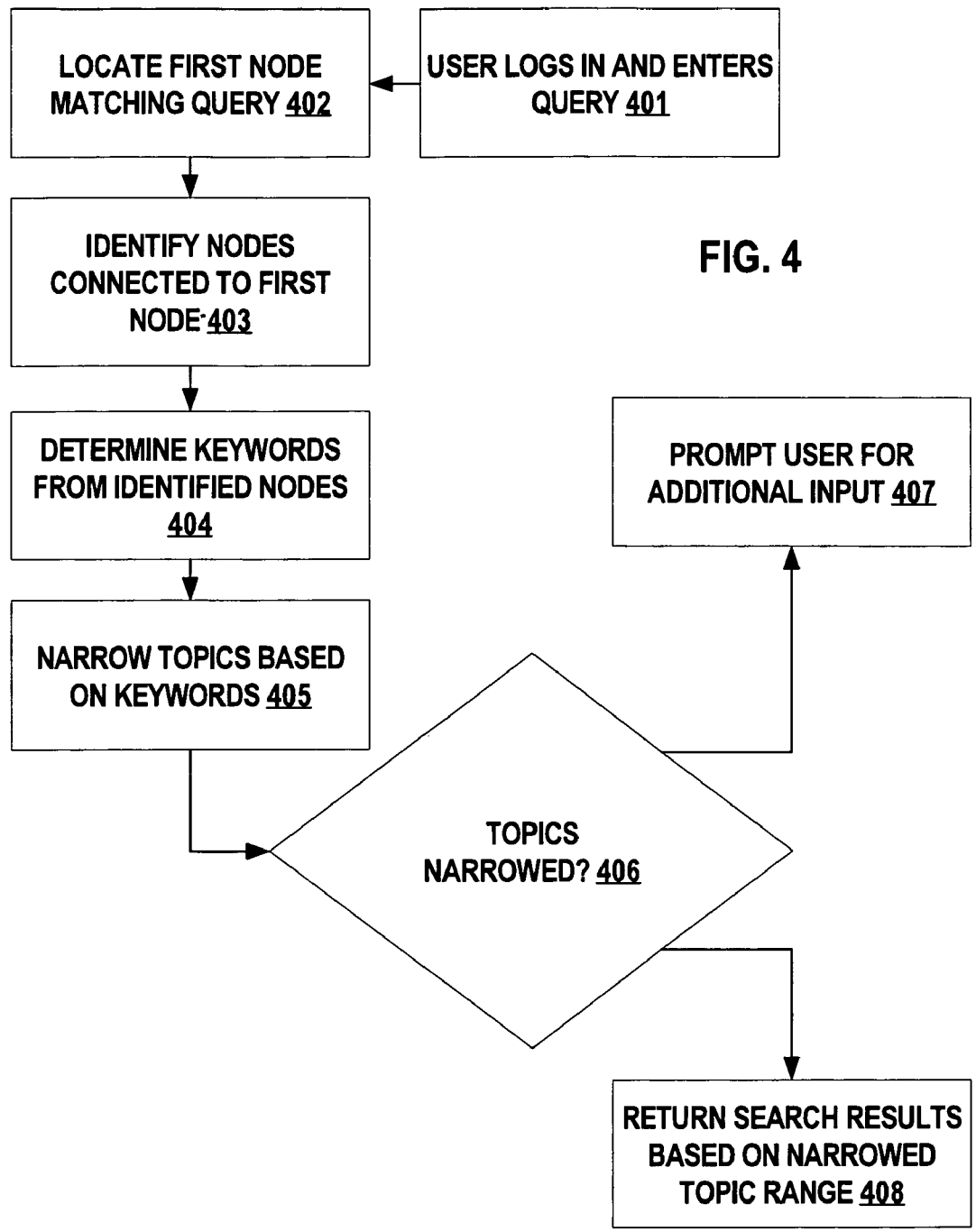
FIG. 4 is a diagram illustrating one method for providing a knowledge based search.

FIG. 4 is a flow diagram of a method for providing a knowledge based search. A user enters a search query after logging on 401. For instance the users enter a search query after navigating to a search website. At step 402, a node or nodes matching the query are found on the keyword graph. In step 403, the keyword graph is traversed to find the nodes close to the matching node. After the close nodes are located, the keywords associated with those nodes are identified in step 404. In step 405, topics are narrowed based on the keywords identified in step 404. In step 406, a determination is made as to whether the topic range is sufficiently narrowed. If the results are sufficiently narrowed, the results may be returned, 408. If the results are be too broad the user may be prompted for additional input, 407.

Hooking a Domain Node to the Graph

A query may be categorized based on a domain node hooked to the keyword graph. To hook a domain node to the keyword graph, the category is matched to a node in the keyword graph. A user can submit a category to be added to the graph. For example, the category of "music" may match a node built from the prisma term "music." The category may be matched to the node based on string matching primitives, a thesaurus, or any other word association method. Alternately, the category may be matched to the node by a content editor. In another example, the category may be matched to the existing node if, upon creating a node for the category, the created node would produce similar degrees of cross-reference and similar graph connections as the existing node.

The node matching the category is located in the keyword graph. The keyword graph stores degrees of cross-reference between nodes. As discussed above, Xref(A,B) represents the frequency by which B is in a set of N top documents resulting from the search query for A. Similarly, Xref(B,A) represents the frequency by which A is in a set of N top documents resulting from the search query for B. If the degrees of cross-reference are stored in the graph, then the degrees of cross-reference do not need to be re-computed when used.

In one embodiment, a domain node is connected to the node that matches the category by creating a node of the domain type and linking it to the node that matches the category. The two nodes are linked together with a full-strength link representing a degree of cross-reference of 100%. In another embodiment, an existing node that matches the category is identified as a domain node. A type for the node may be changed to "domain," for example.

The domain node may be hooked to other nodes. For example, a graph node may already be connected an existing category-matching node in the keyword graph. In this example, the graph would indicate a degree of cross-reference between the graph node and the category-matching node. If the degree of cross-reference between the two nodes meets a threshold, then the domain node is hooked to the graph node with a full-strength, or a connection with a degree of cross-reference of 1.

In one embodiment, nodes may be hooked to the domain node, or included in a domain definition, with a weight of less than 1. For example, the weight may be based on the degrees of cross-reference between the nodes to be included in the domain definition and the category-matching nodes. In another example, the weight may be based on a particular user's search history or preferences.

Once the domain node is in the graph and hooked to a graph node or nodes neighboring the category-matching node, other nodes associated with the hooked graph node may also be hooked to the domain node. For example, a node distant from the domain node in the graph may be associated with the category-matching node through one or more intermediate nodes. For example, a near node may be associated with a hooked graph node with a first degree of cross-reference. The near node may be hooked to the domain node if the first degree of cross-reference satisfies a threshold. A distant node may be associated with the near node based on a second degree of cross-reference. If a combination of the first degree of cross-reference and the second degree of cross-reference meets a threshold, then the distant node may be hooked to the domain node with a full-strength connection. In one embodiment, instead of hooking the near node and the distant node to the domain node, a content editor is provided with terms from both the near node and the distant node. A content editor then determines whether to hook the nodes representing those terms to the domain node.

In one embodiment, the first degree of cross-reference is based at least in part on one or both of: a first frequency by which the near node keyword is in a first set of documents associated with the hooked graph node keyword, and a second frequency by which the hooked graph node keyword is in a second set of documents associated with the near node keyword. In one embodiment, the second degree of cross-reference is based at least in part on one or both of: a first frequency by which the distant node keyword is in a first set of documents associated with the near node keyword, and a second frequency by which the near node keyword is in a second set of documents associated with the distant node keyword. In one embodiment, the domain node is associated to the distant node based at least in part on a combination of the first degree of cross-reference and the second degree of cross-reference. The combination may be a multiplicative combination or some other mathematical relationship that filters out unrelated nodes. For example, the combination, C, could be represented in terms of degrees of cross-reference between near node N, distant node D, and hooked node H, in Equation 1 as follows:

$$C = (Xref(D,N) * Xref(N,D)) * (Xref(H,N) * Xref(N,H)) \quad \text{Equation 1}$$

If the combination of the first degree of cross-reference and the second degree of cross-reference meets a threshold, then the domain node is hooked to the distant node. If the combination is below the threshold, but the first degree of cross-reference is above the threshold, then the near node, but not the distant node, is hooked to the domain node. In one embodiment, a first threshold is used for the first degree of cross-reference, a second threshold for the second degree of cross-reference, and a third threshold is used for the combination. In one embodiment, the total degree of cross-reference $C_n$ between the hooked node and a distant node $D_n$, where n−1 nodes exist between the domain node and the hooked node, $D_0$, is defined recursively in Equation 2 as follows:

$$C_n := C_{n-1} * Xref(D_n, D_{n-1}) * Xref(D_{n-1}, D_n) \qquad \text{Equation 2}$$

In Equation 2, $C_1 = C_0 * Xref(D_1, D_0) * Xref(D_0, D_1)$, where $C_0 = 1$. In Equation 2, $C_1$ represents the degree of cross-reference between a near node and a hooked node, and $C_2$ represents the degree of cross-reference between a distant node and a hooked node.

Figure 5A:
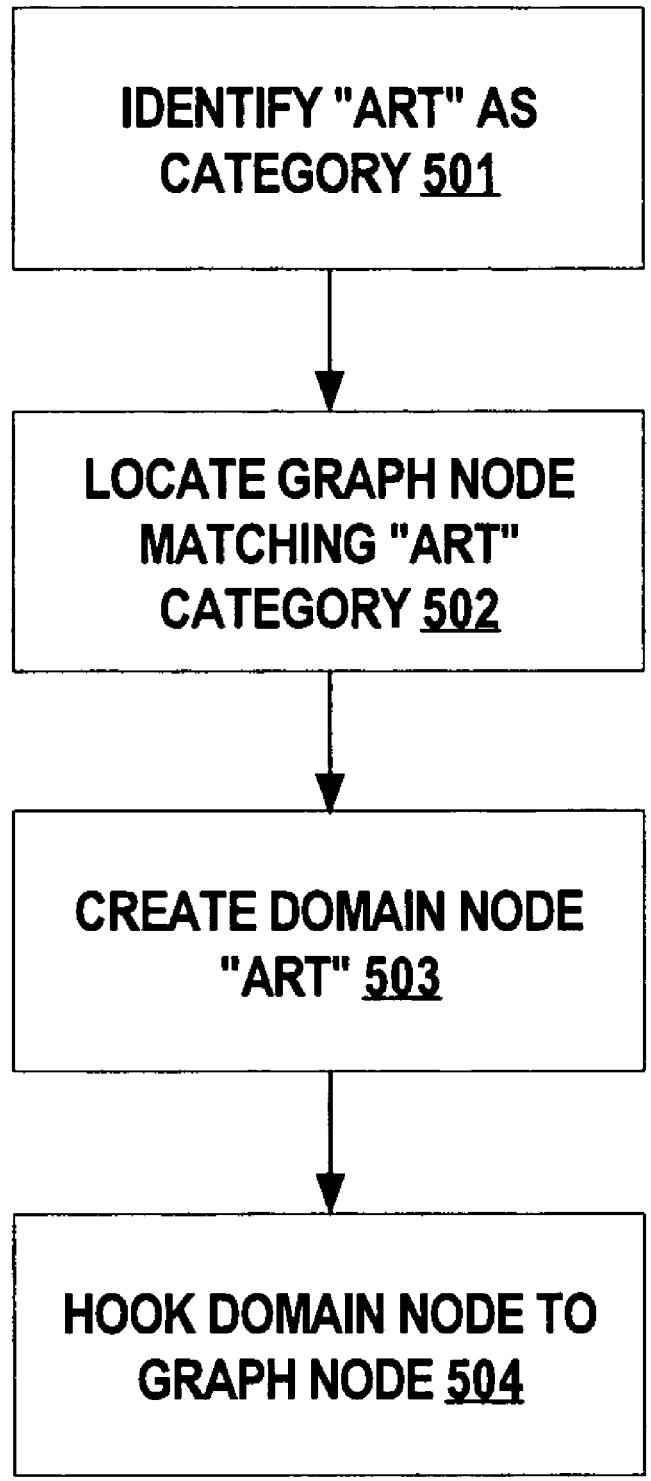
FIGS. 5A-5D are diagrams illustrating methods for hooking a domain node to the keyword graph.

The diagram in FIG. 5A illustrates a first example of hooking a domain node to the keyword graph. In step 501, "Art" is identified as a category. In one embodiment, a user types in "Art" and clicks "Add" to identify "Art" as a category. In another embodiment, a system administrator inputs "Art" as a category. In step 502, a graph node is located that matches "Art." If the graph node does not exist, an "Art" node is created and built into the graph in a similar manner that other graph nodes are initially built into the graph. If a node created from the term "art" already exists, the node is selected. In step 503, a domain node is created. In one embodiment, the domain node is stored as a graph node of a special "domain" type. The domain node is hooked to a graph node in step 504. In one embodiment, a full-strength connection with a degree of cross-reference of 1.0 connects the graph node to the domain node.

Figure 5B:
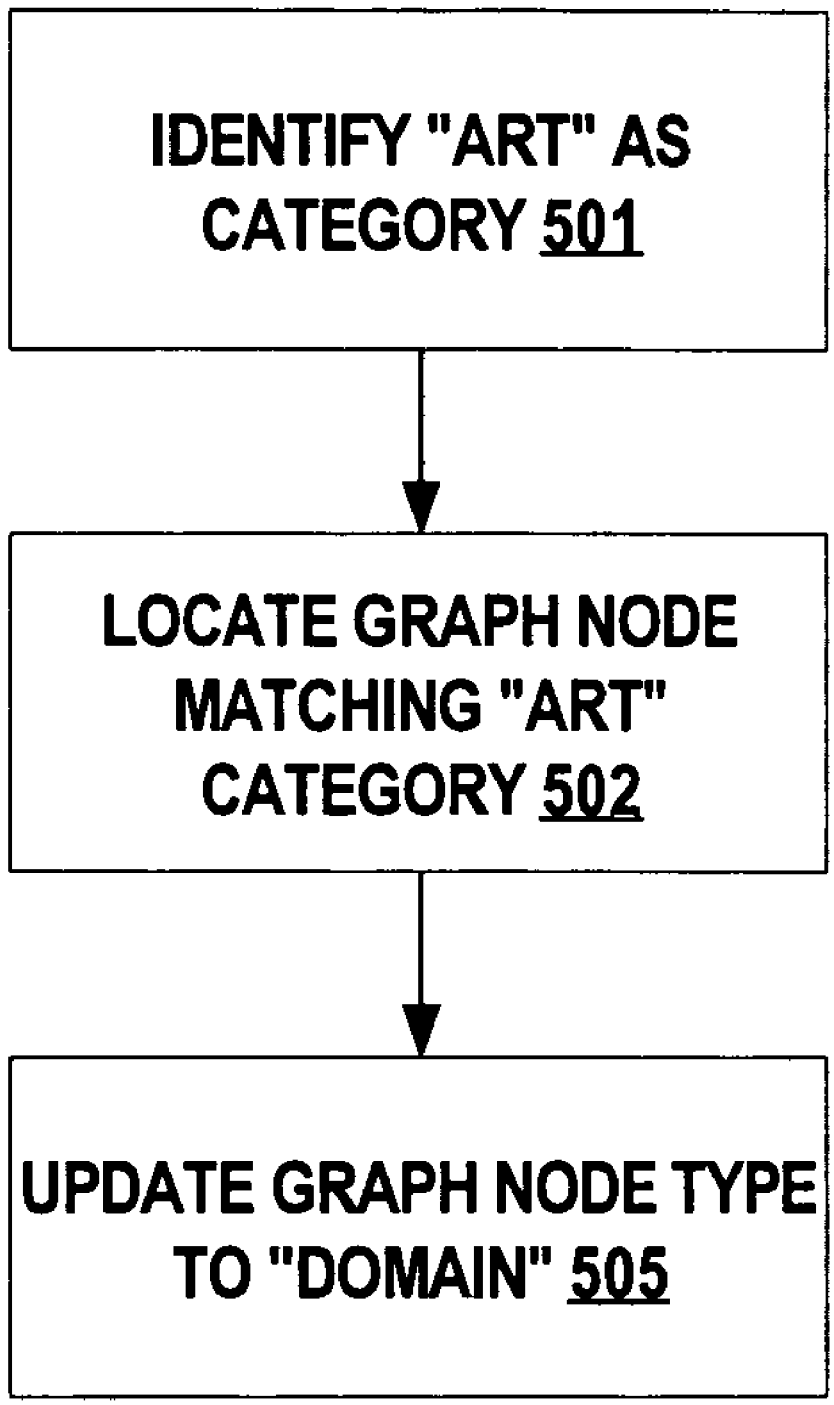

Instead of creating a domain node as in FIG. 5A, the graph node or nodes matching the category can be changed from a standard, or "prisma," type to a "domain" type. Referring to FIG. 5B, the graph node is changed to a domain type in step 505.

Figure 5C:
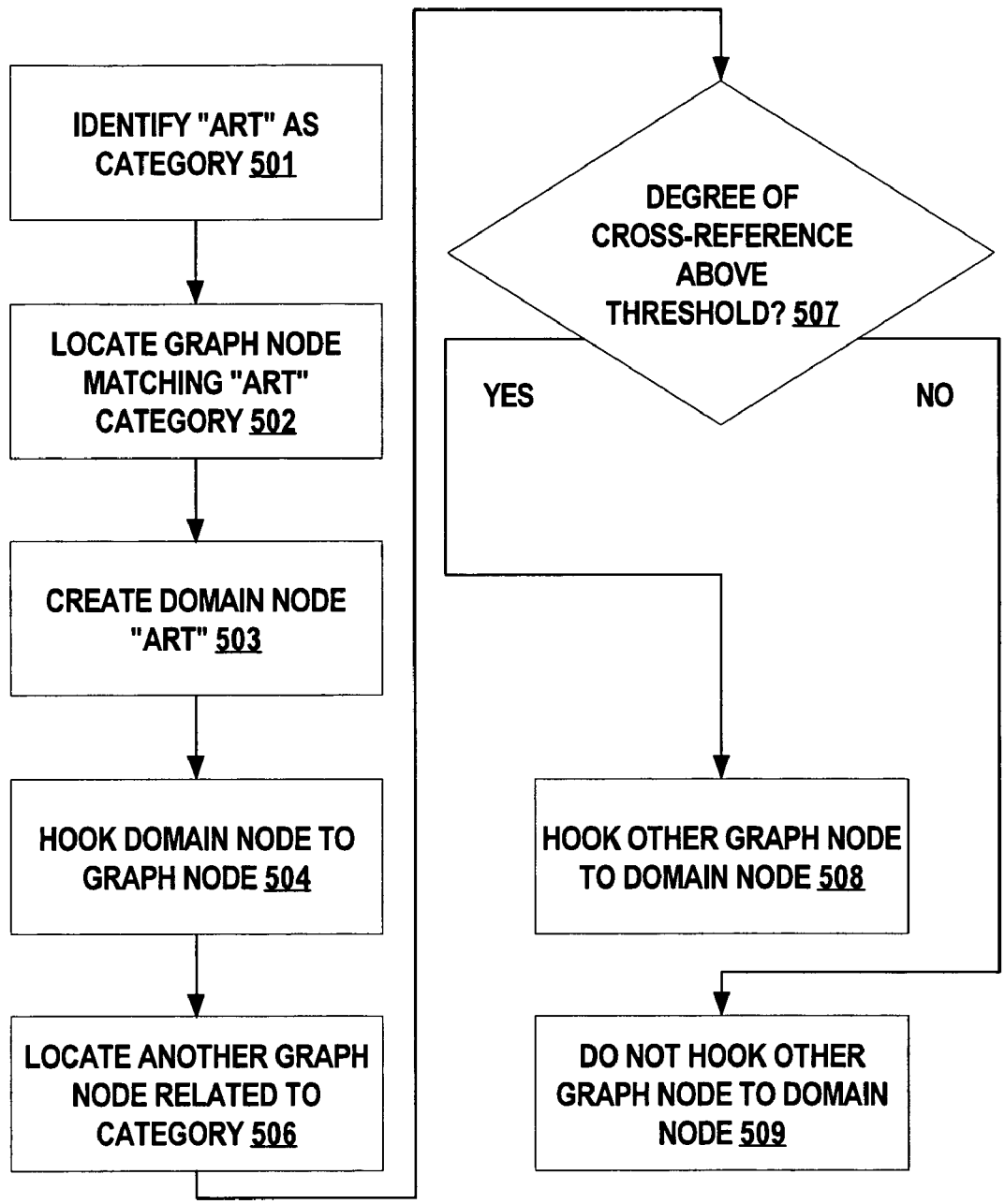

Once the domain node is hooked to the graph in step 504 of FIG. 5A, the domain node can be hooked to other graph nodes, thereby providing better linkage for the category among the set of keywords. FIG. 5C is a diagram that illustrates a method for hooking another graph node to the domain node. The method in FIG. 5C can be used to hook several graph nodes to the domain node. For simplicity, the method shows how to hook one graph node to the domain node.

In FIG. 5C, another graph node is located in step 506. In one embodiment, the other graph node is located by determining which graph nodes are connected to the graph node that matches the category. In another embodiment, a keyword is identified by the user as a keyword that should be in the category. If the user identifies the keyword, then the other graph node is located by matching the keyword to a node or nodes on the graph.

If the other graph node is connected to the domain node through the graph node that matches the category, then a degree of cross-reference between the two nodes is retrieved from the graph. In one embodiment, the degree of cross-reference is compared to a threshold value in step 507. For example, the threshold value may be set at 0.5. If the degree of cross-reference meets or exceeds the threshold, then the other graph node is hooked directly to the domain node in step 508. If the degree of cross-reference is below the threshold, then the other graph node is not hooked to the domain node, step 509. To connect more nodes, steps 506-509 are repeated for all nodes connected to the category-matching node.

Figure 5D:
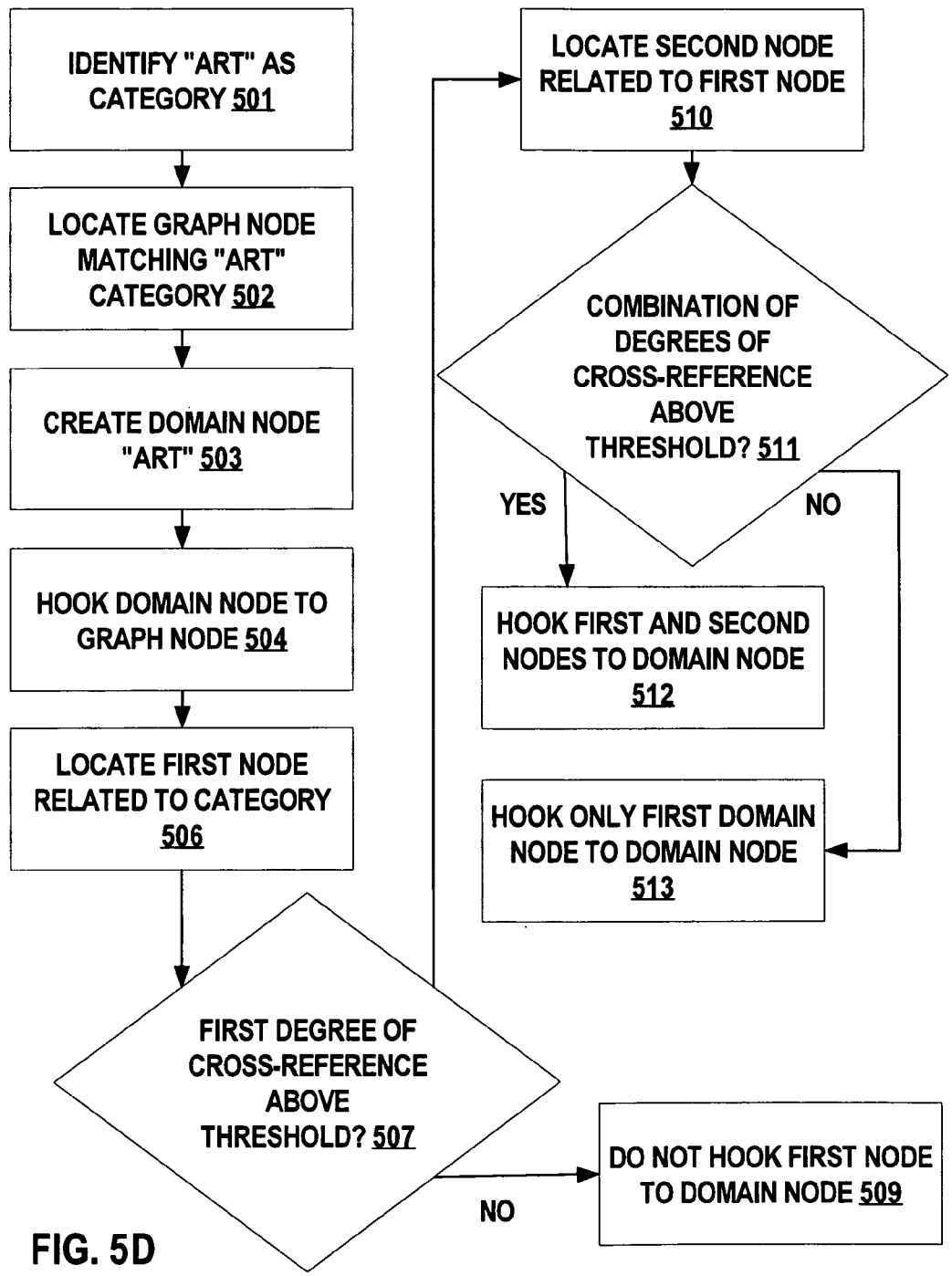

FIG. 5D illustrates how a more distant but related node is hooked to the domain node. In step 502, a category-matching node or nodes is located. The domain node is created in step 503 and hooked to the category-matching node in step 504. As in FIG. 5C, a first node is located, step 506, and compared to a threshold, step 507. If the strength of the link between the first node and the category-matching node does not exceed a threshold, then the first node is not hooked to the domain node, step 509. For example, the threshold in FIG. 6D is set at 0.5. Referring to FIG. 6A, the dancing node 602, the painting node 603, and the literature node 604 all have a degree of cross-reference above 0.5 with the art node 601. Therefore, in FIG. 6D, these nodes are all hooked directly to the domain node. If the threshold was instead set at 0.75, then only the painting node 603 would pass the threshold and be hooked directly to the domain node.

If the first degree of cross-reference does exceed the threshold, then a second node is located that is connected to the first node with a second degree of cross-reference, step 510. A combination of the first degree of cross-reference and the second degree of cross-reference is compared to a threshold in step 511. The combination may be generated by the multiplicative combination of the first degree of cross-reference and the second degree of cross-reference. If the combination exceeds the threshold, the first and second nodes are hooked to the domain node in step 512. If the combination is below the threshold, only the first node is hooked to the domain node in step 513.

For example, the threshold in FIG. 6D is set at 0.5, and the combination is defined as (first degree of cross-reference)* (second degree of cross-reference). Referring to FIG. 6A, the modernism node 607 has a degree of cross-reference of 0.2 with the painting node 603. The painting node 603 has a degree of cross-reference of 0.8 with the art node 601. Accordingly, the combination is 0.8*0.2, or 0.16, which is not above 0.5. Therefore, the modernism node 607 is not hooked to the domain node 610 in FIG. 6D. However, the canvas node 606 is hooked to the domain node in FIG. 6D because the degrees of cross-reference between the canvas node and the art node are 0.7 and 0.8, making the combination 0.56, which is above the threshold.

The combination may alternately be based on either the first degree of cross-reference or the second degree of cross-reference. In one embodiment, steps 507 and 511 are eliminated from FIG. 5D, and the degrees of cross-reference are presumed to exceed the threshold for nodes within a certain distance from the category-matching node. If the distance is set at 2, then every node shown in FIG. 6A would be hooked to the domain node.

Figure 6B:
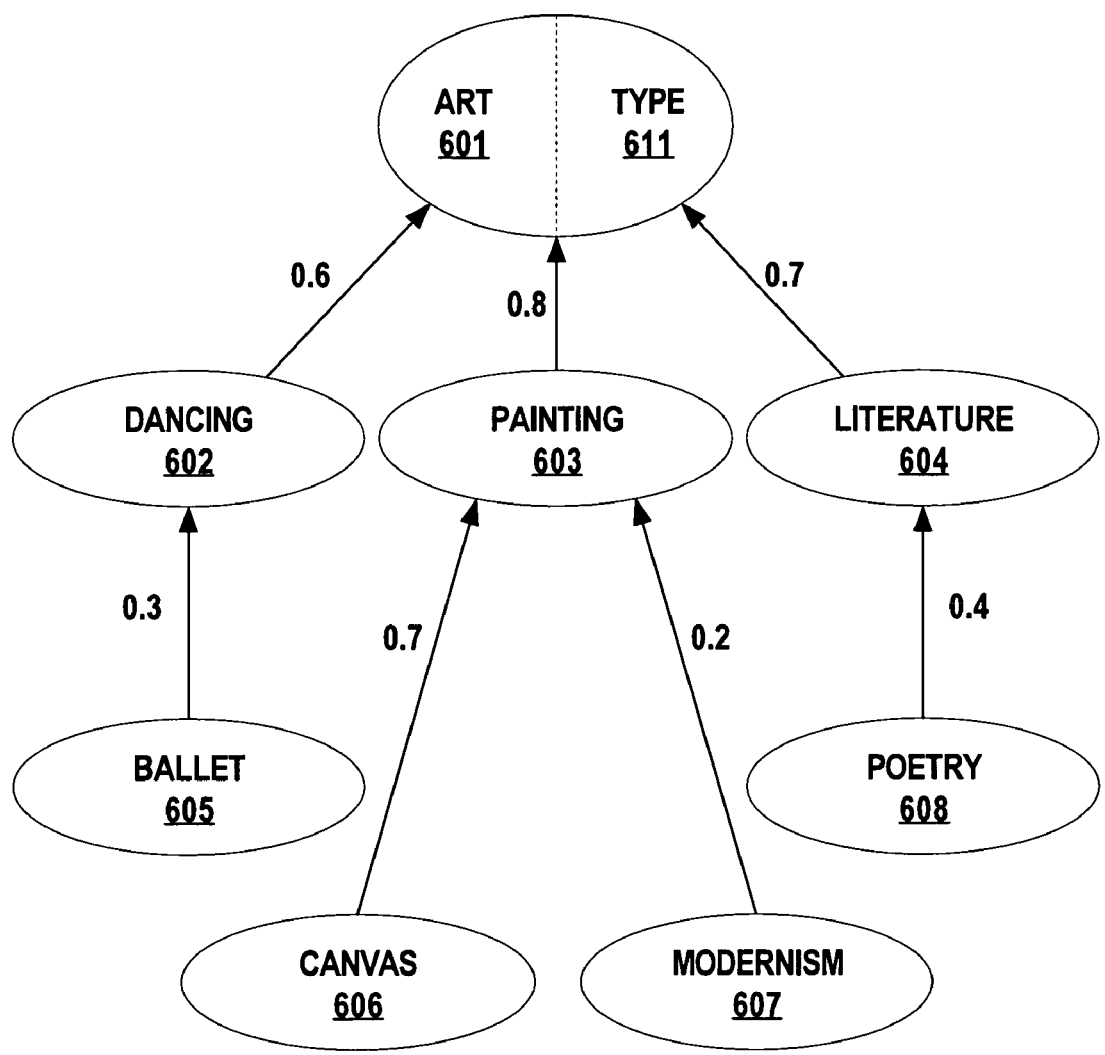
Figure 6C:
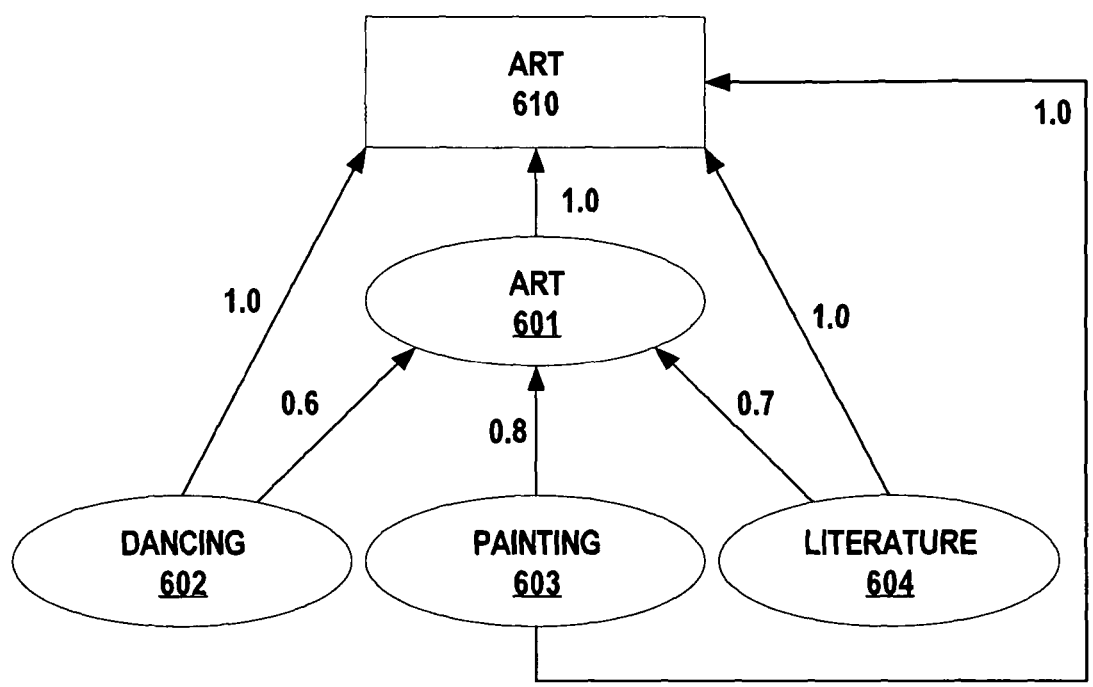
Figure 6D:
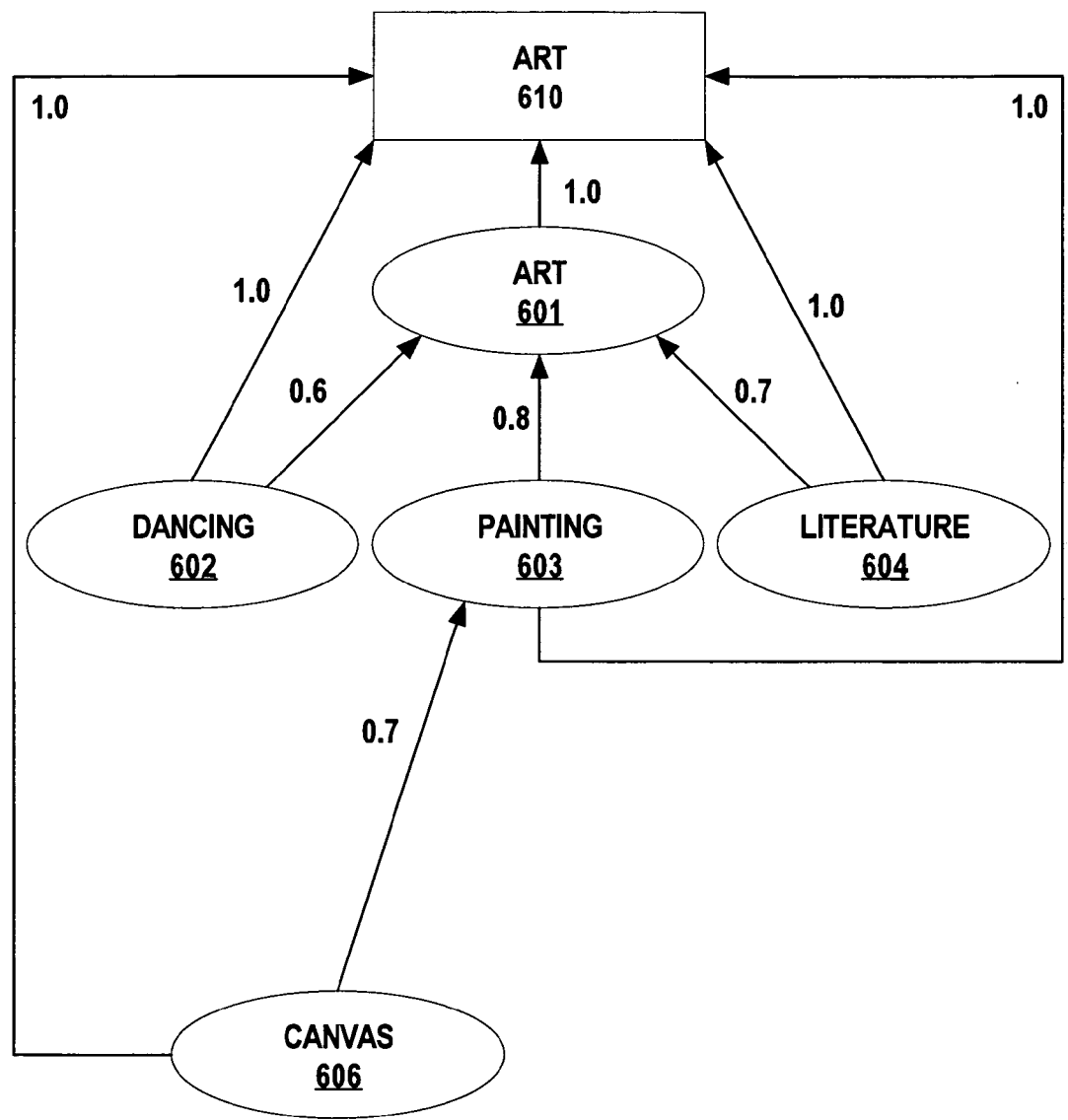

Examples of the keyword graph with a hooked domain node are shown in FIGS. 6A-6D. In FIG. 6A, the art domain node 610 is connected to the art prisma node 601 with a full-strength link as a result of the method shown in FIG. 5A. The art prisma node 601 may also be called the category-matching node, since a user-specified category of "art" matched the art prisma node and caused the art domain node 610 to be connected to the art prisma node 601.

Other nodes such as the dancing node 602, the painting node 603, and the literature node 604, are connected to the art prisma node 601. These other nodes may be called near nodes because they are connected to the art prisma node 601, which is hooked to the domain node 610. Distant nodes such as the ballet node 605, the canvas node 606, the modernism node 607, and the poetry node 608, are connected to the other nodes.

In FIG. 6B, the art node 601 is typed as a domain node according to the method shown in FIG. 5B. In one embodiment, a node type is stored for every node. Nodes 602-608 are prisma nodes, and node 601 shown here is a domain node. In another embodiment, node 601 is typed as both a domain node and a prisma node.

According to the method shown in FIG. 5C, other nodes are connected directly to the domain node as shown in FIG. 6C. For example, the dancing prisma node 602 is associated with the art prisma node 601 with a degree of cross-reference of 0.6. Because the degree of cross-reference meets a threshold, step 507, the dancing prisma node 602 is connected to the art domain node 610 based on a full-strength link with a degree of cross-reference of 1.0.

In the example shown in FIG. 6A, the art prisma node 601 is connected to the painting prisma node 603 with a first degree of cross-reference of 0.8 toward the art prisma node 601. The painting prisma node 603 is connected to the canvas prisma node 606 with a second degree of cross-reference of 0.7 toward the painting node 603. In this example, art is closely associated with painting, and painting is closely associated with canvas.

One may safely presume that the term "canvas" is closely associated with the term "art" by analyzing the first degree of cross-reference and the second degree of cross-reference. According to the method shown in FIG. 5D, the canvas node is directly connected to the art domain node 610 with a full-strength link because of the close association between the two terms.

Referring to step 511 in FIG. 5D, the combination of the first degree of cross-reference and the second degree of cross-reference is compared to a threshold of, for example, 0.5. The first degree of cross-reference in the "canvas" example is 0.8, and the second degree of cross-reference in the example is 0.7. A multiplicative combination of the degrees of cross-reference results in a value of 0.56, which exceeds the threshold of 0.5. Therefore, as shown in FIG. 6D, the canvas node 606 is connected directly to the domain node 610.

Using the Domain Node to Categorize a Query

Once the domain node is sufficiently linked to the graph, the domain node may be used to categorize the query. In one embodiment, the user submits a query in a knowledge-based search. The query is matched to a graph node. From the graph node, the closest domain node is determined by traversing the graph away from the graph node. The category associated with the domain node can be added to the search, and/or keywords associated with the category can be used to narrow the search.

Figure 7A:
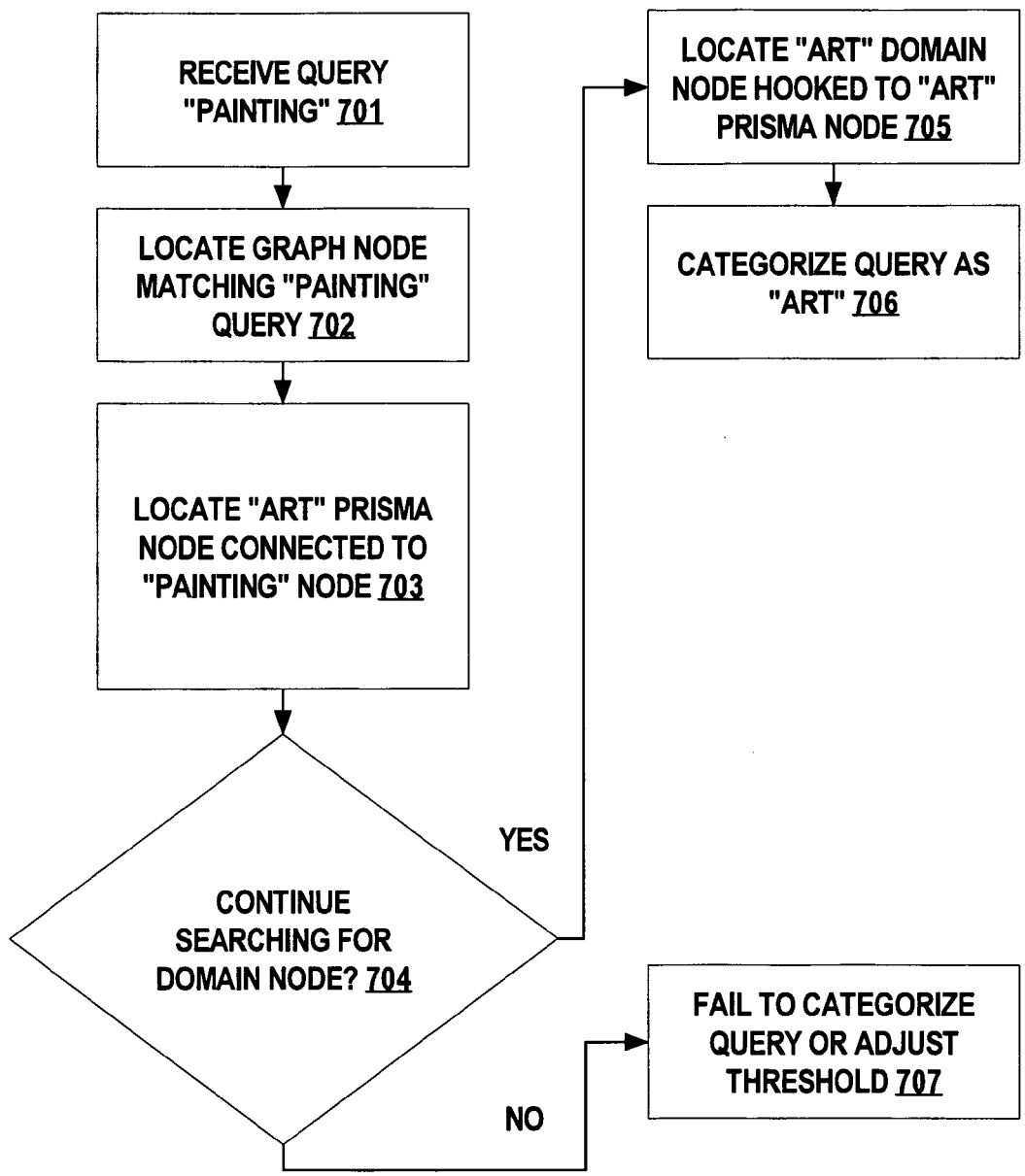
FIGS. 7A and 7B are diagrams illustrating methods for categorizing a query using the domain node.

An example of categorizing a query for "painting" is shown in FIG. 7A. FIG. 7A is based on the underlying keyword graph, or coreference graph, as shown in FIG. 6A. The KBS provider receives a query for "painting" in step 701. In step 702, a graph node is located that matches "painting." Referring to FIG. 6A, the painting prisma node 603 is connected to the art prisma node 601. In step 703 of FIG. 7A, the art node is located as one of the nodes connected to the painting node in step 703.

The graph is traversed away from the graph node or nodes matching the query. In one embodiment, the graph is traversed only for a specified number of node connections away from the graph node. For example, if the domain node is required to be within one node of the graph node, then the knowledge-based search provider would decide to stop searching for domain nodes in step 704. As a result, the search provider would fail to categorize the query in step 707. On the other hand, if the domain node can be up to two nodes away from the graph node, then the provider would decide to continue searching for domain nodes in step 704. In step 705, the "art" domain node is located as a node hooked to the "art" prisma node. The query can then be categorized as "art" in step 706, and the category is used to enhance the search. In one embodiment, step 704 is eliminated, and the graph is traversed until a domain node is found.

Figure 7B:
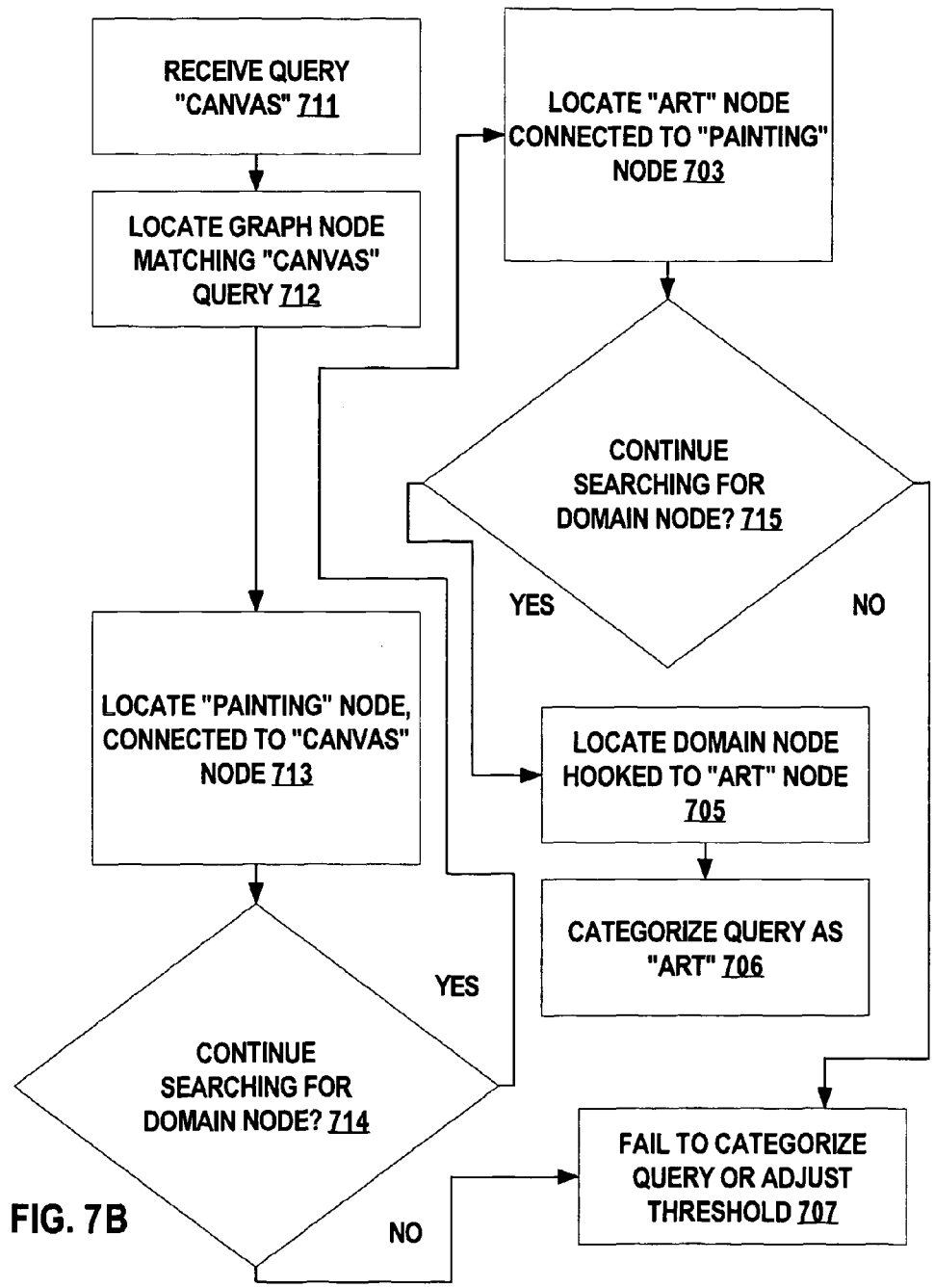

FIG. 7B shows an embodiment where the query matches a distant node. A query matching "canvas" is received in step 711. FIG. 6A shows the canvas prisma node 606 is connected to the painting prisma node 603, which is connected to the art prisma node 601. The canvas prisma node 606 is located in step 712, and the painting prisma node 603 is located in step 713.

A determination 714 is made as to whether to continue searching for the domain node. If the provider required the domain node to be directly connected to the node matching the query, then the query is not categorized in step 707. If the provider determines to traverse the graph several nodes away from the node matching the query, then the process continues onto step 703. In step 703, the "art" prisma node is located as a node connected to the "painting" prisma node.

Another determination 715 is made as to whether to continue searching for the domain node. If the provider decides to continue searching, the domain node is found in step 705 and used to categorize the query in step 706. If the provider decides to stop searching in step 715, then the provider fails to categorize the query in step 707.

Using the Category and the Query to Generate Content

Figure 8A:
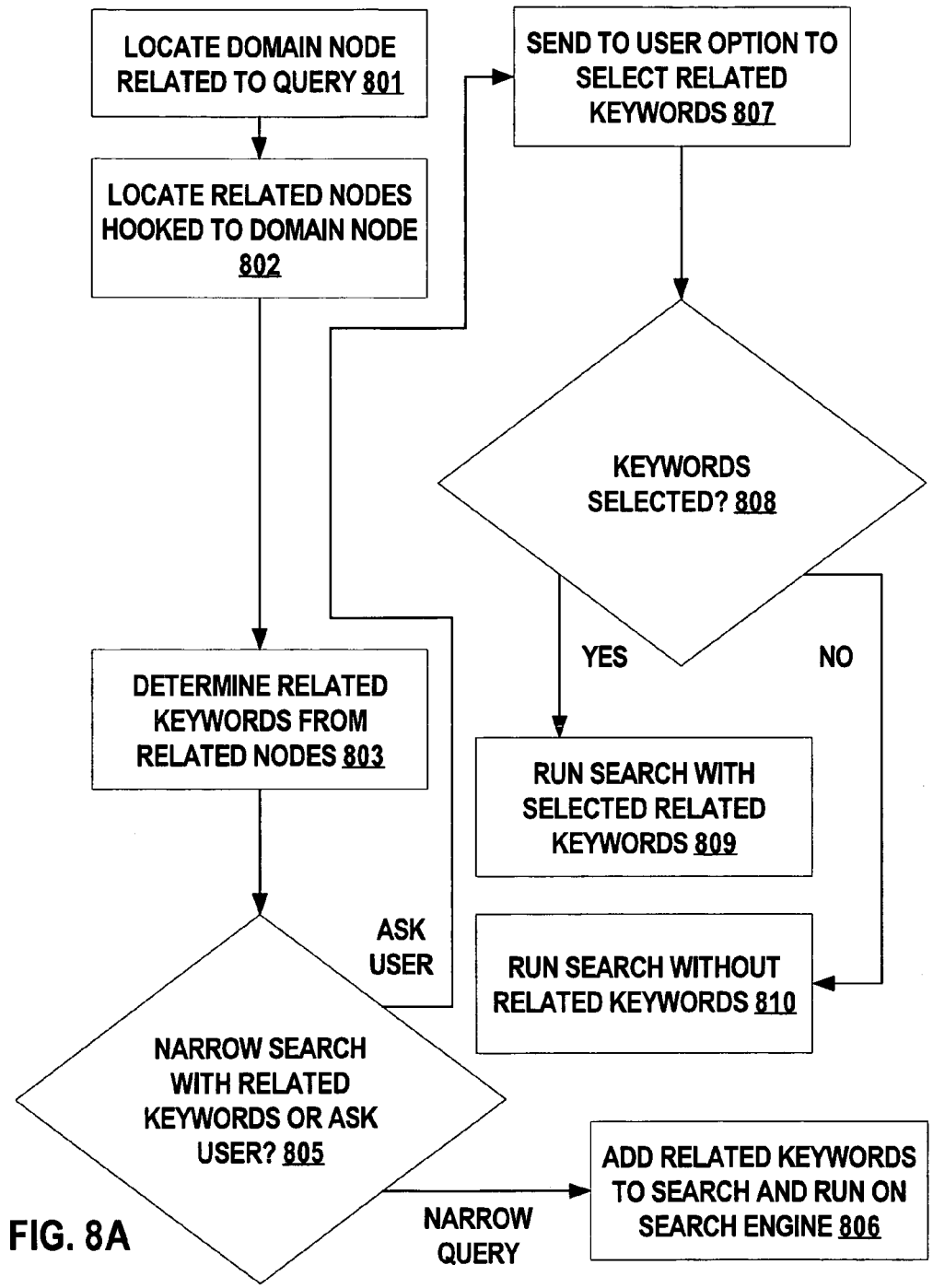
FIGS. 8A and 8B are diagrams illustrating applications of query categorization and keyword expansion.

Once the query is categorized, the category, domain node, and/or related keywords are used to improve the search. In FIG. 8A, the domain node related to the query is located in step 801, as shown in FIGS. 7A and 7B. In step 802, the graph is used to identify a set of related nodes that are hooked to the domain node. For example, FIG. 6C shows prisma nodes dancing 602, painting 603, literature 604, and art 601 as hooked directly to the domain node art 610.

In step 803, related keywords are determined from the related nodes. In the example, "dancing," "painting," "literature," and "art" are related keywords from the related nodes. In step 805, the knowledge-based search provider determines whether to narrow the search with the set of related keywords or to ask the user for additional input. If the search is narrowed with the related keywords, then a search is performed on the query plus the related keywords in step 806.

If the knowledge-based search provider asks for user input, the user is sent an option to select related keywords in step 807. A determination is made as to whether the user has selected any keywords in step 808. If the user selected keywords, then the search is run on the query along with the selected related keywords in step 809. If the user did not select keywords, then a standard search on the query is performed in step 810. In one embodiment, the search is sent to a module designed to handle queries related to the category.

Figure 8B:
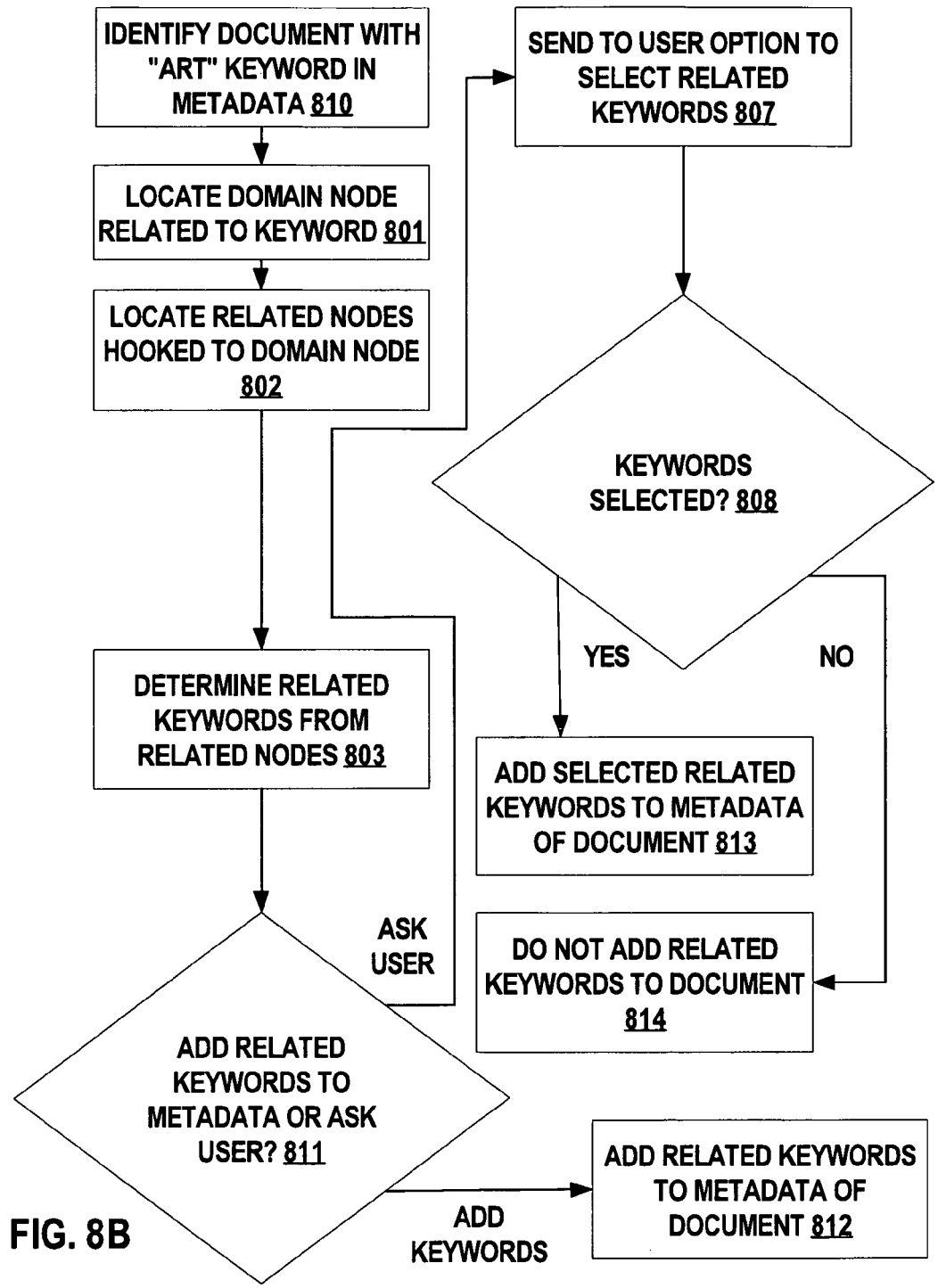

FIG. 8B shows how the domain node can be used to expand the metadata in a document. In step 810, a document is identified with the "art" keyword in the metadata. In step 801, the art domain node 610 of FIG. 6D, for example, is located as the closest domain node to the art prisma node 601. In step 802, the nodes hooked to the domain node are located. For example, the prisma nodes art 601, dancing 602, canvas 606, painting 603, and literature 604 are located because they are hooked to the art domain node 610.

In step 811, the knowledge-based search provider either prompts the user for additional input or adds the keywords. To add the keywords, the knowledge-based search provider adds the related keywords to the metadata of the document. In the example, the metadata is modified from "art" to "art dancing canvas painting literature."

Alternately, to prompt the user for additional input, the knowledge-based search provider sends the user an option to select related keywords in step 807. A determination is made in step 808 as to whether the user selected keywords. If the user selected keywords, then the selected keywords are added to the metadata of the document in step 813. For example, if the user selected "canvas" and "painting," then the metadata would be modified to "art canvas painting." If the user did not select any keywords, then the metadata remains unchanged, step 814.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
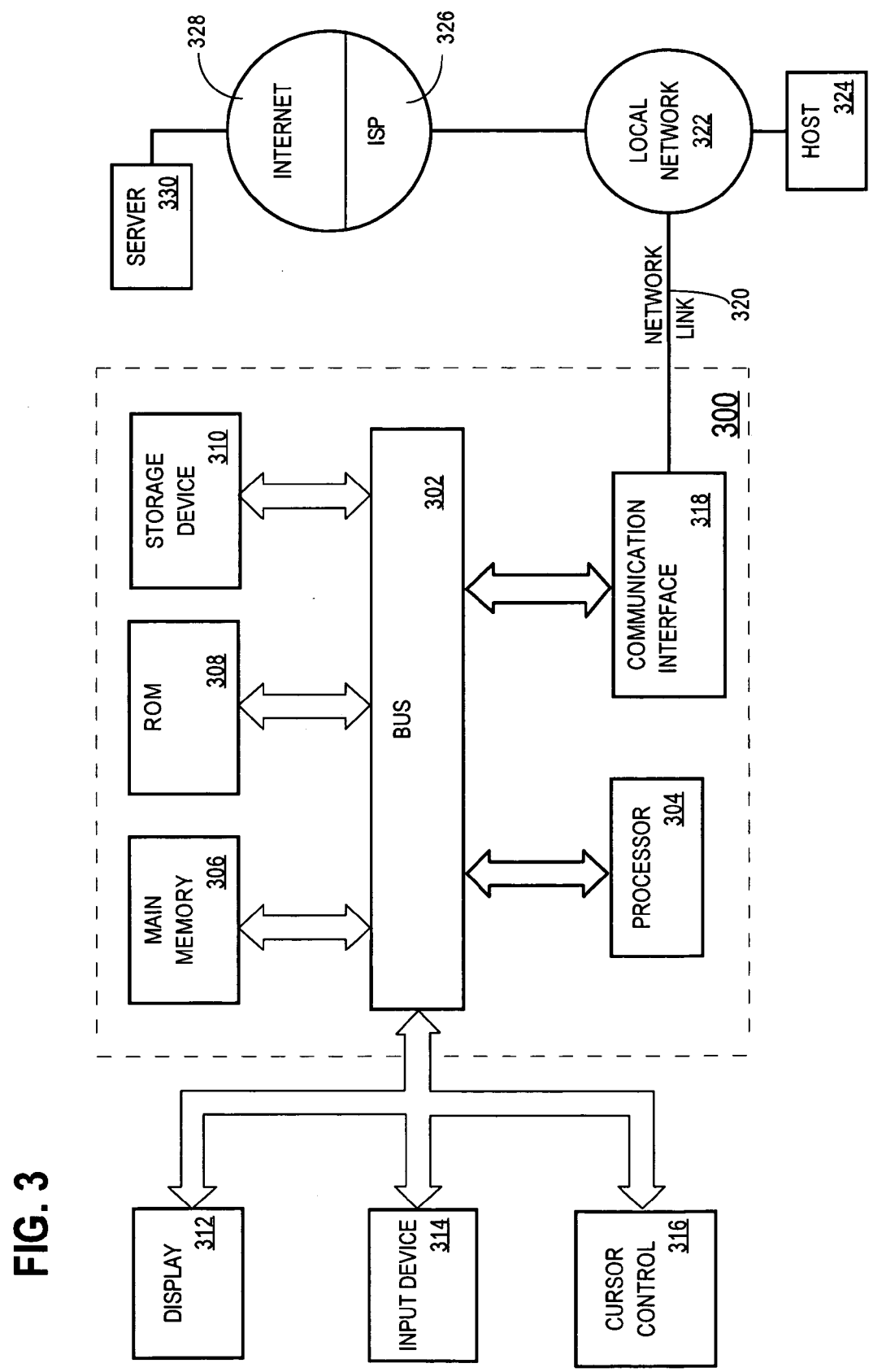
FIG. 3 is a diagram illustrating one computer system that can be used to store, modify, and use a keyword graph.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   one or more computing devices associating a category to a set of nodes of a graph by:
   the one or more computing devices determining a first node that represents a first term that is in the category;
   the one or more computing devices locating a second node associated with the first node based at least in part on a first degree of cross-reference between the first node and the second node, the second node representing a second term, wherein the first degree of cross-reference is based at least in part on a frequency by which the first term appears in a set of documents with the second term;
   the one or more computing devices locating a third node associated with the second node based at least in part on a second degree of cross-reference between the second node and the third node, the third node representing a third term, wherein the second degree of cross-reference is based at least in part on a frequency by which the second term appears in a set of documents with the third term;
   based at least in part on both (a) the first degree of cross-reference between the first node and the second node, and (b) the second degree of cross-reference between the second node and the third node, determining whether or not the third term is in the category;
   in response to determining that the third term is in the category, storing information that indicates the third term is in the category.

2. The computer-implemented method of claim 1, wherein the first degree of cross-reference is based at least in part on a frequency by which the second term is in a set of documents associated with the first term.

3. The computer-implemented method of claim 1, wherein the first degree of cross-reference is based at least in part on a frequency by which the first term is in a set of documents associated with the second term.

4. The computer-implemented method of claim 1, wherein the first degree of cross-reference is a based at least in part on a combination of two or more of:
   a first frequency by which the second term is in a first set of documents associated with the first term;
   a second frequency by which the first term is in a second set of documents associated with the second term;
   a first relative frequency based at least in part on the first frequency and a total frequency of the first term;
   a second relative frequency based at least in part on the first frequency and a total frequency of the second term;
   a first document ranking of documents of said first set of documents that contain the second term; or
   a second document ranking of documents of said second set of documents that contain the first term.

5. The computer-implemented method of claim 1, further comprising:
   determining that the first node is a domain node that represents the category;
   wherein storing the information that indicates the third term is in the category comprises storing a full-strength link between the third node and the domain node.

6. The computer-implemented method of claim 1, wherein determining whether or not the third term is in the category is based at least in part on a multiplicative combination of:
   the first degree of cross-reference between the second node and the first node; and
   a second degree of cross-reference between the third node and the second node;
   wherein determining whether or not the third term is in the category comprises determining whether the multiplicative combination satisfies a threshold.

7. The computer-implemented method of claim 1, further comprising:
   categorizing a query by the one or more computing devices performing:
   locating a particular node in a set of nodes of a graph, the particular node representing a particular term that matches the query;
   using the graph to locate the third node by traversing the graph away from the particular node;
   categorizing the query as in the category based at least in part on the stored information that indicates the third term is in the category.

8. The computer-implemented method of claim 7, further comprising:
   receiving, from the user, a selection of a set of selected terms in the category; and
   storing a second information that indicates that the query is associated with the set of selected terms.

9. The computer-implemented method of claim 7, further comprising sending the query to a module that provides content related to the category.

10. The computer-implemented method of claim 1, wherein the category is associated with a set of related nodes, the method further comprising:
   determining a set of related terms, each term of the set of related terms associated with a node of the set of related nodes;
   determining that a query is associated with at least one term of the set of related terms;
   in response to determining that the query is related to the at least one term of the set of related terms, storing a second information that indicates the query is associated with at least one other term of the set of related terms.

11. The computer-implemented method of claim 10, wherein said category is associated with said set of related nodes by:
   determining a set of connected nodes that are connected to said first node in the graph, each connected node associated with a connected term;
   for each particular connected node of said connected nodes:
   determining a particular degree of cross-reference between the particular connected node and said first node;
   determining whether the particular degree of cross-reference satisfies a particular threshold;
   in response to determining that the particular degree of cross-reference satisfies the particular threshold, storing the particular connected node as a related node of said set of related nodes.

12. The computer-implemented method of claim 11, wherein each particular degree of cross-reference is based at least in part on a frequency by which the connected term for the particular connected node is in a set of documents associated with the first term.

13. The computer-implemented method of claim 11, wherein each particular degree of cross-reference is based at least in part on a frequency by which the first term is in a set of documents associated with the connected term for the particular connected node.

14. The computer-implemented method of claim 11, wherein each particular degree of cross-reference is based at least in part on both:
   a first frequency by which the connected term for the particular connected node is in a first set of documents associated with the first term; and
   a second frequency by which the first term is in a second set of documents associated with the connected term for the particular connected node.

15. The computer-implemented method of claim 1, wherein the category is associated with a set of related nodes, further comprising:
   determining a set of related terms, each term of the set of related terms associated
   with a related node of the set of related nodes;
   locating a document with metadata containing at least one term of the set of related terms;
   storing at least one other term of the set of related terms in the metadata.

16. The computer-implemented method of claim 1, further comprising:
   determining whether the first degree of cross-reference satisfies a first threshold;
   determining whether the second degree of cross-reference satisfies a second threshold;
   wherein storing the information is performed in response to determining both that the first degree of cross-reference satisfies the first threshold and that the second degree of cross-reference satisfies the second threshold.

17. The method of claim 1, wherein both the first degree of cross-reference and the second degree of cross-reference are greater than zero percent and less than one-hundred percent, and wherein the information that indicates the third term is in the category is a one-hundred percent association between the third node and a node representing the category.

18. A volatile or non-volatile computer-readable storage medium storing one or more sequences of instructions which, when executed by one or more computing devices, cause the one or more computing devices to perform: associating a category to a set of nodes of a graph by:
   determining a first node that represents a first term that is in the category;
   locating a second node associated with the first node based at least in part on a first degree of cross-reference between the first node and the second node, the second node representing a second term, wherein the first degree of cross-reference is based at least in part on a frequency by which the first term appears in a set of documents with the second term;
   locating a third node associated with the second node based at least in part on a second degree of cross-reference between the second node and the third node, the third node representing a third term, wherein the second degree of cross-reference is based at least in part on a frequency by which the second term appears in a set of documents with the third term;
   based at least in part on both (a) the first degree of cross-reference between the first node and the second node, and (b) the second degree of cross-reference between the second node and the third node, determining whether or not the third term is in the category;
   in response to determining that the third term is in the category, storing information that indicates the third term is in the category.

19. The volatile or non-volatile computer-readable storage medium of claim 18, wherein the first degree of cross-reference is based at least in part on a frequency by which the second term is in a set of documents associated with the first term.

20. The volatile or non-volatile computer-readable storage medium of claim 18, wherein the first degree of cross-reference is based at least in part on a frequency by which the first term is in a set of documents associated with the second term.

21. The volatile or non-volatile computer-readable storage medium of claim 18, wherein the first degree of cross-reference is a based at least in part on a combination of two or more of:
   a first frequency by which the second term is in a first set of documents associated with the first term;
   a second frequency by which the first term is in a second set of documents associated with the second term;
   a first relative frequency based at least in part on the first frequency and a total frequency of the first term;
   a second relative frequency based at least in part on the first frequency and a total frequency of the second term;
   a first document ranking of documents of said first set of documents that contain the second term; or
   a second document ranking of documents of said second set of documents that contain the first term.

22. The volatile or non-volatile computer-readable storage medium of claim 18, wherein the one or more sequences of instructions, when executed by the one or more processors, further cause the one or more processors to perform:
    determining that the first node is a domain node matching the category;
    wherein storing the information that indicates the third term is in the category comprises storing a full-strength link between the third node and the domain node.

23. The volatile or non-volatile computer-readable storage medium of claim 18, wherein the threshold is a first threshold, wherein the one or more sequences of instructions, when executed by the one or more processors, cause the one or more processors to perform the step of determining whether or not the third term is in the category based at least in part on a multiplicative combination of:
    the first degree of cross-reference between the second node and the first node; and
    a second degree of cross-reference between the third node and the second node;
    wherein the one or more sequences of instructions, when executed by the one or more processors, cause determining whether or not the third term is in the category at least in part by determining whether the multiplicative combination satisfies a threshold.

24. The volatile or non-volatile computer-readable storage medium of claim 18, wherein the one or more sequences of instructions, when executed by the one or more processors, further cause the one or more processors to perform:
    categorizing a query by the one or more computing devices performing:
    locating a particular node in a set of nodes of a graph, the particular node representing a particular term that matches the query;
    using the graph to locate the third node by traversing the graph away from the particular node;
    categorizing the query as in the category based at least in part on the stored information that indicates the third term is in the category.

25. The volatile or non-volatile computer-readable storage medium of claim 24, wherein the one or more sequences of instructions, when executed by the one or more processors, further cause the one or more processors to perform:
    receiving, from the user, a selection of a set of selected terms in the category; and
    storing a second information that indicates that the query is associated with the set of selected terms.

26. The volatile or non-volatile computer-readable storage medium of claim 24, wherein the one or more sequences of instructions, when executed by the one or more processors, further cause the one or more processors to perform sending the query to a module that provides content related to the category.

27. The volatile or non-volatile computer-readable storage medium of claim 18, wherein the category is associated with a set of related nodes, wherein the one or more sequences of instructions, when executed by the one or more processors, further cause the one or more processors to perform:
    determining a set of related terms, each term of the set of related terms associated with a node of the set of related nodes;
    determining that a query is associated with at least one term of the set of related terms;
    in response to determining that the query is related to the at least one term of the set of related terms, storing a second information that indicates the query is associated with at least one other term of the set of related terms.

28. The volatile or non-volatile computer-readable storage medium of claim 27, wherein the one or more sequences of instructions, when executed by the one or more processors, cause the one or more processors to perform associating the category with said set of related nodes by:
    determining a set of connected nodes that are connected to said first node in the graph, each connected node associated with a connected term;
    for each particular connected node of said connected nodes:
    determining a particular degree of cross-reference between the particular connected node and said first node;
    determining whether the particular degree of cross-reference satisfies a particular threshold;
    in response to determining that the particular degree of cross-reference satisfies the particular threshold, storing the particular connected node as a related node of said set of related nodes.

29. The volatile or non-volatile computer-readable storage medium of claim 28, wherein each particular degree of cross-reference is based at least in part on a frequency by which the connected term for the particular connected node is in a set of documents associated with the first term.

30. The volatile or non-volatile computer-readable storage medium of claim 28, wherein each particular degree of cross-reference is based at least in part on a frequency by which the first term is in a set of documents associated with the connected term for the particular connected node.

31. The volatile or non-volatile computer-readable storage medium of claim 28, wherein each particular degree of cross-reference is based at least in part on both:
    a first frequency by which the connected term for the particular connected node is in a first set of documents associated with the first term; and
    a second frequency by which the first term is in a second set of documents associated with the connected term for the particular connected node.

32. The volatile or non-volatile computer-readable storage medium of claim 18, wherein the category is associated with a set of related nodes, wherein the one or more sequences of instructions, when executed by the one or more processors, further cause the one or more processors to perform:
    determining a set of related terms, each term of the set of related terms associated
    with a related node of the set of related nodes;
    locating a document with metadata containing the query at least one term of the set of related terms;
    storing at least one other term of the set of related terms in the metadata.

33. The volatile or non-volatile computer-readable storage medium of claim 18, wherein the one or more sequences of instructions, when executed by the one or more processors, further cause the one or more processors to perform:
    determining whether the first degree of cross-reference satisfies a first threshold;
    determining whether the second degree of cross-reference satisfies a second threshold;
    wherein storing the information is performed in response to determining both that the first degree of cross-reference satisfies the first threshold and that the second degree of cross-reference satisfies the second threshold.

34. The volatile or non-volatile computer-readable storage medium of claim 18, wherein both the first degree of cross-reference and the second degree of cross-reference are greater than zero percent and less than one-hundred percent, and wherein the information that indicates the third term is in the category is a one-hundred percent association between the third node and a node representing the category.

* * * * *

UNITED STATES PATENT AND TRADEMARK OFFICE
CERTIFICATE OF CORRECTION

PATENT NO.         : 8,041,729 B2                                                   Page 1 of 1
APPLICATION NO.    : 12/390066
DATED              : October 18, 2011
INVENTOR(S)        : Gilles Vandelle et al.

It is certified that error appears in the above-identified patent and that said Letters Patent is hereby corrected as shown below:

COLUMN 18

Claim 32: Line 42: Delete "the query".

Signed and Sealed this
Twenty-ninth Day of November, 2011

David J. Kappos
*Director of the United States Patent and Trademark Office*